Patented Feb. 16, 1954

2,669,531

UNITED STATES PATENT OFFICE 2,669,531

REMOVAL OF SPENT POLYMERIZATION CATALYST

Alexander G. Petkus, La Grange, Ill., assignor to Universal Oil Products Company, Chicago, Ill., a corporation of Delaware No Drawing. Application December 22, 1947, Serial No. 793,309

4 Claims. (Cl. 134—30)

This invention relates to an improved method for removing packed beds of spent catalyst from a chamber, and more particularly for removing beds of granular or pellet type of solid polymerization catalyst from reactor tubes or chambers.

The polymerization process is now widely used in the petroleum industry to effect greater total yields of high grade gasoline per barrel of crude oil processed. In the polymerization process, a portion of the olefin-containing gases from a cracking operation may be converted catalytically into a motor polymer of a high octane number which may be blended into a motor gasoline.

There are various types of solid granular catalyst used for polymerizing the olefin-containing gases, for example, the catalyst may be a meta- or ortho-phosphoric acid catalyst, or one of the metal pyrophosphate catalysts. However, the following description relating to this improved method of removal, concerns all types of polymerization catalyst although a solid phosphoric acid catalyst may be mentioned hereinafter as the granular or pellet type of material which is employed in beds within the polymerization reactors, and which must be removed after losing its activity. In general, a polymerization catalyst bed may be used for a relatively long period of time when the proper moisture content is maintained within the bed, so as to prevent its dehydration and deactivation and the resulting deposition of heavy polymers and carbonaceous materials. However, at given intervals all chambers or tubular reactors will require a removal of the spent bed of material and its replacement with a refreshed catalyst. The removal of the catalyst bed has proved to be a difficult problem to the industry since the material tends to cake-up and stick to the walls of the reaction chambers.

There are two types of polymerization reactors in general use, the chamber type, which is the most common, and the tubular reactor type, which employs a plurality of catalyst retaining tubes within a shell or housing. In each type of unit, the catalyst particles are maintained in stationary beds and the hydrocarbon stream is passed therethrough to contact the catalyst material. Also, in the chamber type of unit, there are usually several separate beds maintained within a single chamber, with each catalyst bed being supported on a suitable grid, screen, or perforated plate.

Plant operators, up to the present time, have found no very satisfactory method of removing the spent catalyst from the reactors, but in general, mechanical apparatus and manual means have been relied upon to effect the removal of the packed material. The drilling of the bed by power-driven drilling apparatus is one of the common methods used by plant operators to effect removal of the packed catalyst, but as may be evident, the drilling operation is a slow and tedious one so that as a consequence, it is expensive in the use of man power as well as in plant "shut-down time." Air hammers, and other chipping apparatus, have also been employed to remove the material, however, this method is also slow and expensive and the result is not favored by most operators.

In some instances plant operators employ the method of dislodging the material from below by high pressure streams of water, the streams being jetted up against the bottom of the beds from the lower end of the reactor chamber. Also, in a few instances chains or cables have been buried in the catalyst bed when the catalyst is first placed in the chamber, so that they may be used to break up the bed and remove it after the unit is shut down. The catalyst is removed and broken up in the same manner coke is removed from coke chambers by the embedded cable method. The disadvantage of this latter method is of course, that considerable trouble is encountered due to chain or cable breakage and the packed bed is not completely pulled free of the chamber or broken up in a manner which makes the material easily removable from the reactor.

According to this invention, the improved method of removing a spent and packed bed of polymerization catalyst from a confined zone comprises, the steps of, applying steam to the bed for a period sufficiently long to effect the removal of a substantial amount of the hydrocarbonaceous material which is retained within the bed and to effect a partial softening of the catalyst material and subsequently opening the confined zone at a point below the catalyst bed, applying a substantially high pressure hot aqueous stream to the top of the bed, and thereby forcing the catalyst material from the lower end of the confined zone.

The hot aqueous stream may be a high pressure hot water stream, high pressure steam, or as will be noted in more detail subsequently, the hydraulic pressure on the upper surface of the bed may be effected by alternately using steam and hot water. The particular pressures and time elements employed in the removal process are variable since different conditions may be encountered in different reactors. For example, the severity and length of the steaming operation may be adjusted to suit the extent of the dehydration of the catalyst bed and the amount of tar-like carbonaceous deposit that is present within the spent bed of catalyst. In the normal removal operation, steaming of the catalyst bed for a period of the order of 1 to 2 hours is adequate to distill all of the vaporizable hydrocarbonaceous material and to effect the removal of a portion of the heavy tar-like deposit as well. This period of time should also be adequate to effect a certain amount of softening of the phosphoric acid catalyst bed and tend to loosen it somewhat from the wall of the chamber.

Immediately following the steaming operation, the lower access head of the chamber may be removed, or alternately, the outer nozzle communicating with the chamber at a point below the packed bed of catalyst may be opened and hydraulic pressure applied to the top of the catalyst bed. The hydraulic pressure is preferably applied with a hot liquid stream or by high pressure steam. The amount of pressure necessary to force the bed loose from the chamber and break it up will of course vary somewhat for each removal operation, however, where the bed has been adequately steamed and subjected to soaking, a hydraulic pressure of the order of 2 to 6 atmospheres should be sufficient to force the bed loose. By pumping the high pressure stream into the upper portion of the chamber, over the top of the catalyst bed, the pressure can be built up gradually, so that the bed will normally break loose at a relatively low superatmospheric pressure of the order of 2 to 4 atmospheres.

In some cases, the catalyst bed may be packed extremely hard, in which case a second period of soaking may be advisable, or alternately, a longer than the normal 1 to 2 hour period may be employed, to effect a more complete softening of the packed catalyst bed. The hydraulic pressure applied to the top of the bed may be raised and lowered by opening and closing a valve in the lines supplying the steam or water to the chamber. This latter treatment of alternately applying and releasing the pressure at the top of the catalyst bed, appears to have the effect of applying and repeating an impact type of force to the material and quickly removes the bed where a low steady pressure proves inadequate.

The method of removal appears to be equally applicable to the tubular type of reactor as well as the chamber type. Each tube is steamed individually and subsequently aqueous pressure applied to the top of the catalyst in each tube to eject the material, so that they may be repacked and made ready for use.

The improved operation is also particularly advantageous for removing superimposed catalyst beds from chambers having a multiple bed arrangement. In carrying out the removal of catalyst beds from the multiple bed chamber, the operation steps, which have been outlined hereinabove, are carried out on each bed individually, starting at the bottom of the chamber and steaming and forcing each bed out of the lower end of the chamber.

In addition to the removal of the catalyst bed in a rapid manner in comparison to the aforementioned mechanical methods of drilling and chipping, the improved steaming and pressure removing method of this invention causes the material to break loose from the chamber wall in a clean smooth manner that makes it unnecessary in nearly all cases to enter the chamber in order to remove adhering material. It has further been noted that the operation is normally carried out in a short enough period of time so that little or no corrosion of the chamber wall takes place, as might be expected from a mild phosphoric acid being formed from the water contacting the solid phosphoric acid pellets, where the latter are employed as the polymerization catalyst. However, it is advisable after effecting the removal of the catalyst bed, or beds, from a chamber, to subject the unit to a thorough washing with a water stream and thereby remove any wet catalyst or acid which might be lodged within the reactor chamber.

I claim as my invention:

1. A method for removing a packed bed of spent polymerization catalyst from a confined zone, which comprises, passing steam through said bed for a sufficient time to distill hydrocarbonaceous materials therefrom and effect a partial softening of said catalyst, subsequently opening said confined zone to the atmosphere below said bed, and applying a sufficiently high hydraulic pressure in a downward direction to the entire top surface of said bed to force said catalyst from the lower end of said confined zone.

2. In the removal of a packed bed of spent granular catalyst from a confined zone, where said catalyst is of the type used in polymerizing hydrocarbons, the improved method which comprises, passing steam through said bed for a period sufficient to distill substantially all the lower boiling and a portion of the higher boiling tar-like hydrocarbonaceous material therefrom and to soften said catalyst, subsequently opening said confined zone to the atmosphere at a point below said bed, applying a high pressure hot aqueous stream in a downward direction to the entire top surface of said bed at spaced intervals of time, the pressure of said stream being sufficient to force said catalyst from said zone.

3. The method of claim 2 further characterized in that said hot aqueous stream comprises high pressure steam.

4. The method of claim 2 further characterized in that said high pressure hot aqueous fluid stream is a hot water stream.

ALEXANDER G. PETKUS.

References Cited in the file of this patent

UNITED STATES PATENTS

| Number | Name | Date |
|---|---|---|
| 1,603,541 | Huff | Oct. 19, 1926 |
| 2,076,847 | Johnston | Apr. 13, 1937 |
| 2,245,554 | Court | June 17, 1941 |
| 2,289,351 | Dixon et al. | July 14, 1942 |